United States Patent
Oh et al.

(10) Patent No.: US 8,049,716 B2
(45) Date of Patent: Nov. 1, 2011

(54) APPARATUS AND METHOD FOR CONTROLLING OPERATION OF PORTABLE TERMINAL HAVING MULTIMEDIA FUNCTION

(75) Inventors: Gung-Gun Oh, Gumi-si (KR);
Hark-Sang Kim, Daegu (KR);
Seok-Hyo Park, Gumi-si (KR);
Jae-Hyoung Jeon, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1139 days.

(21) Appl. No.: 11/746,567

(22) Filed: May 9, 2007

(65) Prior Publication Data
US 2008/0028404 A1    Jan. 31, 2008

(30) Foreign Application Priority Data

Jul. 28, 2006 (KR) .................. 10-2006-0071438

(51) Int. Cl.
*G09G 5/00* (2006.01)
*G06F 3/02* (2006.01)
(52) U.S. Cl. ............... 345/156; 345/169; 455/556.1; 455/566
(58) Field of Classification Search .......... 345/156–184, 345/211; 455/556.1, 556.2, 566
See application file for complete search history.

(56) References Cited

U.S. PATENT DOCUMENTS

| 7,119,827 | B2 * | 10/2006 | Kang .................. 348/14.02 |
| 7,725,139 | B2 * | 5/2010 | Song et al. .................. 455/574 |
| 2004/0192400 | A1 * | 9/2004 | Chwa .................. 455/566 |
| 2005/0130705 | A1 * | 6/2005 | Shin .................. 455/556.2 |
| 2005/0248685 | A1 * | 11/2005 | Seo et al. .................. 348/376 |

\* cited by examiner

*Primary Examiner* — Jimmy H Nguyen
(74) *Attorney, Agent, or Firm* — Jefferson IP Law, LLP

(57) ABSTRACT

An apparatus and method for controlling an operation of a portable terminal having a multimedia function are provided. The apparatus includes a multimedia processor for performing the multimedia function when a controller is in a sleep mode wherein the controller is converted to an active mode when a specified key signal is input into the controller in the sleep mode and outputs an inactive signal to inactivate the multimedia processor. According to the present invention, the portable terminal having the controller controlling the mobile communication function and the multimedia processor controlling the multimedia function, can independently perform the mobile communication function and the multimedia function according to the specified key input. Furthermore, according to the present invention, the controller which controls the mobile communication function need not control the multimedia processor which controls the multimedia function. Hence, it is possible to reduce power consumption and software errors occurring when the controller controls the multimedia processor.

8 Claims, 3 Drawing Sheets

APPARATUS AND METHOD FOR CONTROLLING OPERATION OF PORTABLE TERMINAL HAVING MULTIMEDIA FUNCTION

PRIORITY

This application claims the benefit under 35 U.S.C.§119(a) of a Korean patent application filed in the Korean Industrial Property Office on Jul. 28, 2006 and assigned Serial No. 2006-71438, the entire disclosure of which is hereby incorporated by reference.

BACKGROUND OF THE INVENTION

1. Field of the Invention

The present invention relates to an apparatus and a method for controlling the operation of a portable terminal. More particularly, the present invention relates to an apparatus and a method for controlling the operation of a portable terminal having a multimedia function.

2. Description of the Related Art

As communication technologies have improved, the demand for portable terminals that include various multimedia functions in addition to the conventional mobile communication function has increased.

Therefore, portable terminals capable of providing multimedia functions, such as portable terminals having a portable multimedia player (PMP) combined therewith, have been rapidly developed.

The above-mentioned portable terminals, which provide a multimedia function, have an embedded multimedia processor for performing the multimedia function. The portable terminals also include a control processor for controlling the mobile communication function, for example a Mobile Station Modem (MSM).

In the above-mentioned portable terminals, the control processor controls the multimedia processor in performing the multimedia function.

Therefore, because the control processor controls the multimedia processor while the portable terminal performs a multimedia function, the control processor must maintain an active mode at all times in order to control the multimedia function or the communication function. Accordingly, consumption of electric power increases and the probability of software error occurrence also increases.

SUMMARY OF THE INVENTION

Accordingly, the present invention has been made to address the above-mentioned problems and/or disadvantages, and an object of the present invention is to provide an apparatus and a method for controlling the operation of a portable terminal having a mobile communication function and a multimedia function.

According to an aspect of the present invention, an apparatus for controlling an operation of a portable terminal having a mobile communication function and a multimedia function is provided. The apparatus includes a multimedia processor for performing a multimedia function when a controller is in a sleep mode wherein the controller is converted to an active mode when a specified key signal is input into the controller in the sleep mode and wherein the controller outputs an inactive signal to inactivate the multimedia processor.

According to another aspect of the present invention, a method for controlling the operation of a portable terminal having a mobile communication function and a multimedia function is provided. The method includes performing a multimedia function by the multimedia processor if the controller is in a sleep mode, converting the controller from the sleep mode to an active mode if a specified key signal is input into the controller in a state of being in the sleep mode, outputting a signal to inactivate the multimedia processor and performing the mobile communication function by the controller which is converted to the active mode.

BRIEF DESCRIPTION OF THE DRAWINGS

The above and other objects, features and advantages of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
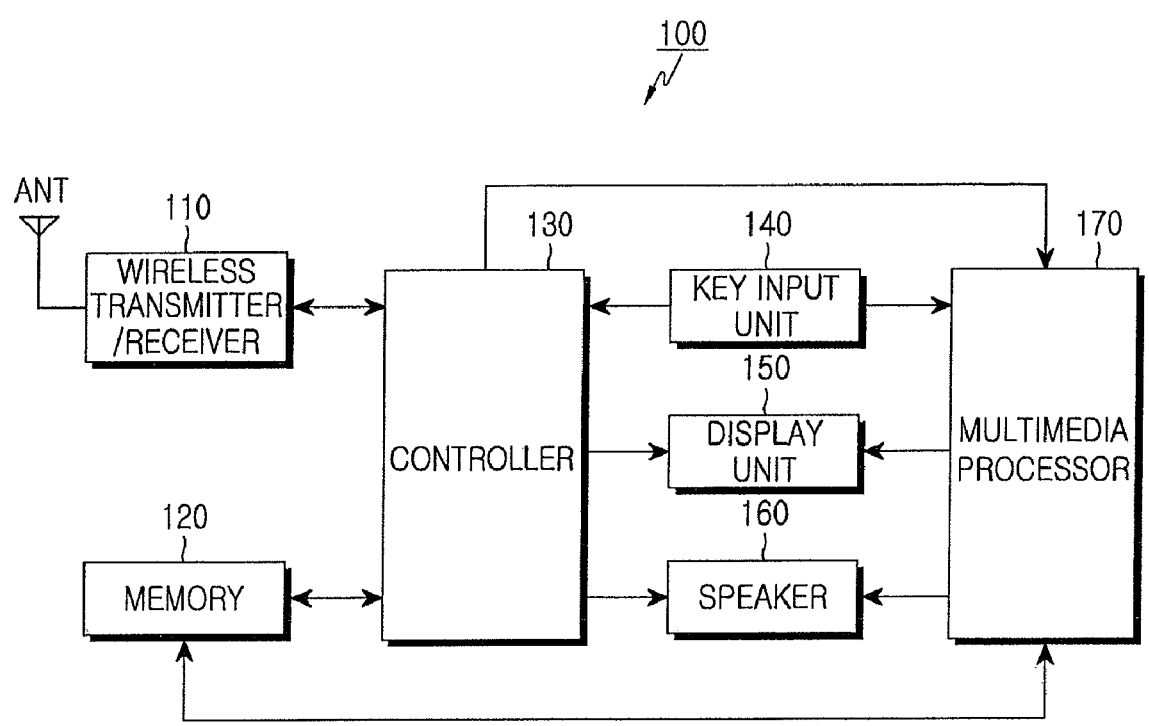
FIG. 1 is a block diagram illustrating a portable terminal according to an exemplary embodiment of the present invention.

FIG. 1 is a block diagram illustrating a portable terminal according to an exemplary embodiment of the present invention.

As illustrated in FIG. 1, an exemplary portable terminal 100 includes a wireless transmitter/receiver 110, a memory 120, a controller 130, a key input unit 140, a display unit 150, a speaker 160, and a multimedia processor 170.

The portable terminal 100 according to an exemplary embodiment of the present invention can perform a mobile communication function and a multimedia function. It is noted that the multimedia processor 170 performs the multimedia function independently of the controller 130.

Referring to FIG. 1, the wireless transmitter/receiver 110 is a Radio Frequency (RF) unit and refers to a comprehensive unit including a high frequency processor, an intermediate frequency processor, and a baseband processor. The wireless transmitter/receiver 110 transmits and receives voice data, character data, picture data, and control data under the control of the controller 130.

The memory 120, according to an exemplary embodiment of the present invention, may include a program memory and a data memory for storing various information required to control the operation of the portable terminal and for storing various information based on user selection information. As an example, the memory 120 may include a ROM for storing an operation algorithm accessed by the controller 130 for the overall operations of the portable terminal 100 and a RAM for storing data depending on control instructions in a procedure for processing data of the controller 130.

According to an exemplary embodiment of the present invention, the controller 130 may be a Mobile Station Modem (MSM) chip that controls the overall operation of the portable terminal 100. For example, the controller 130 controls the mobile communication function of the portable terminal 100.

The controller 130, and the multimedia processor 170 which will be described later, are capable of both an active mode and an inactive or sleep mode. When the controller 130 is in the sleep mode, the controller may receive a specified key signal so as to be converted from the sleep mode to an active mode. Also, when receiving a specified key signal, the controller 130 may output a signal in order to inactivate the multimedia processor 170 which performs the multimedia function. After the multimedia processor 170 is converted to an inactive mode, the controller 130 allows the portable terminal 100 to perform the mobile communication function.

In an exemplary embodiment, a specified key signal may be an input from one of the keys included in the key input unit 140. In another exemplary embodiment, a portable terminal, such as a communication terminal which can be used as a PMP, which has a Liquid Crystal Display (LCD) window and a key pad arranged on either side of the main body thereof, a specified key signal may be an input from an external key arranged on the exterior of the portable terminal 100 for a user's convenience in operating keys.

When receiving a specified key signal in an activated state, the controller 130 outputs an active signal to activate the multimedia processor 170. Upon receipt of a specified key signal, the controller 130 may also be converted to a sleep mode. As an example, if a specified key signal is input into the controller 130 while the controller is in the active mode and while the multimedia processor 170 is in the inactive mode, the controller 130 activates the multimedia processor 170 and is converted to the sleep mode. Therefore, it is possible to reduce unnecessary power consumption because the multimedia processor 170 can independently perform the multimedia function.

In an exemplary embodiment, the key input unit 140 includes character keys, numeric keys, various function keys, and external volume control buttons, etc. The key input unit 140 outputs key input signals, corresponding to a user's key input, to the controller 130. In an exemplary embodiment, the key input unit 140 may include a slide key which slidably moves on the outer surface of the portable terminal 100.

The display unit 150 may include an LCD, etc., and outputs various display data generated in the portable terminal 100.

Under the control of the controller 130, the speaker 160 outputs voice data input to the wireless transmitter/receiver 110, or outputs corresponding voice data when the portable terminal 100 performs a multimedia function.

According to an exemplary embodiment of the present invention, the multimedia processor 170 independently performs a multimedia function of the portable terminal 100 while the multimedia processor 170 is in the activate state. That is, the multimedia processor 170 can independently perform a multimedia function regardless of the state of the controller 130, even if the controller 130 is in the sleep mode. The multimedia function refers to a function of processing any of various media including voices, figures, pictures, etc.

As an exemplary embodiment, FIG. 1 illustrates a portable terminal 100 provided with one key input unit 140 and one display unit 150. However, the invention is not limited in this regard. In another exemplary embodiment, a portable terminal, with which a Portable Multimedia Player (PMP) is combined, may have a first display unit and a first key input unit arranged on a front surface of the main body and always exposed to the outside, and a second display unit and a second key input unit arranged on a rear surface of the main body and always exposed to the outside. In both embodiments, any of the display units may include an LCD. Furthermore, if an LCD is included, the LCD may provide an input capability so as to also function as an input unit.

In an exemplary embodiment, the controller 130 controls the first display unit and the first key input unit, which are arranged on the front surface of the main body, to perform the mobile communication function. The multimedia processor 170 can control the second display unit and the second key input unit, which are arranged on the rear surface of the main body, to perform the multimedia function. In such an exemplary portable terminal, the specified key input, which is used for independently performing the mobile communication function and the multimedia function, is arranged on the external surface of the portable terminal. However, the specified key input may be located at any other location on the portable terminal.

Figure 2A:
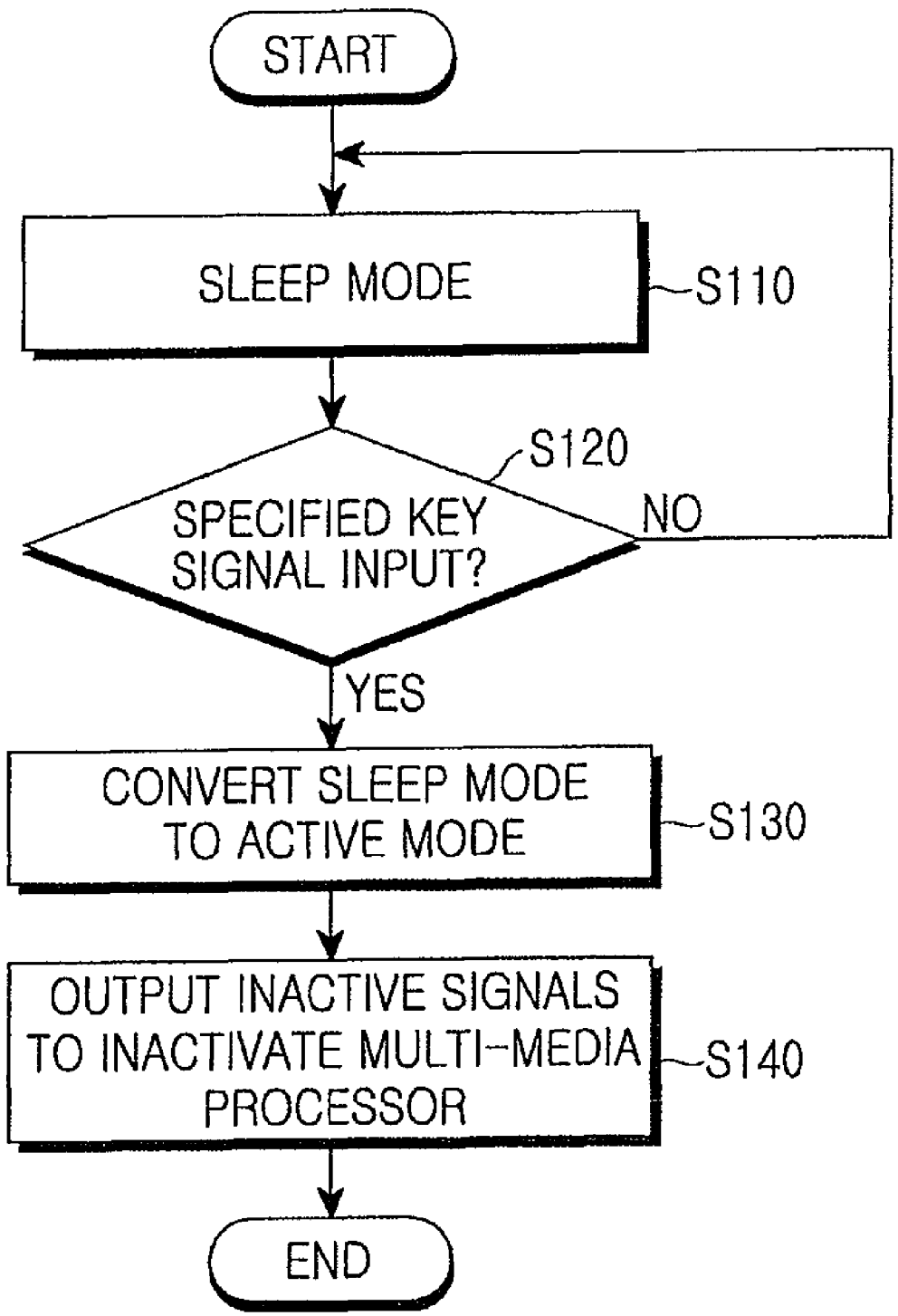
FIGS. 2A and 2B are flowcharts illustrating a method for controlling the operation of the portable terminal according to an exemplary embodiment of the present invention.
Figure 2B:
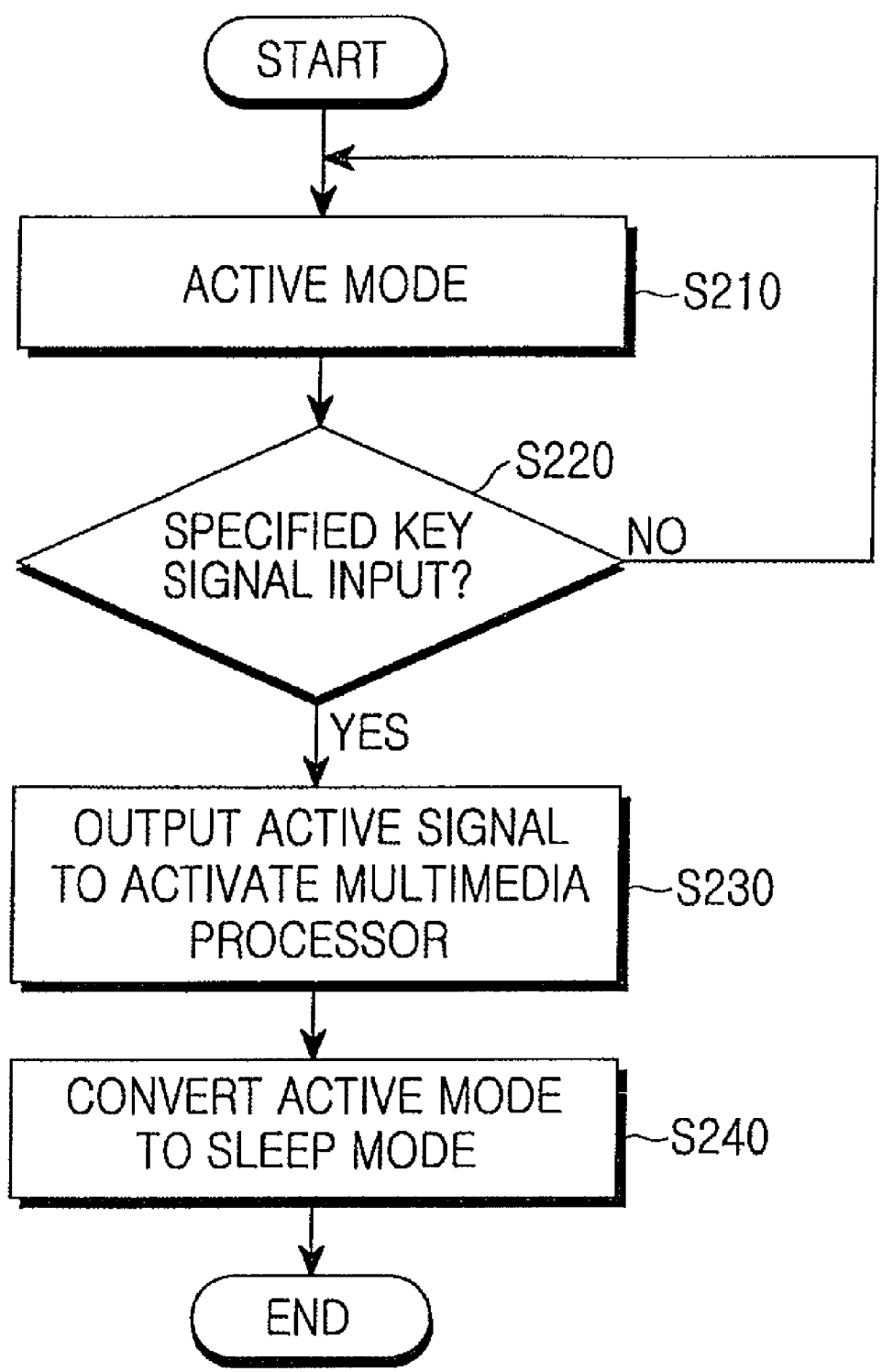

FIGS. 2A and 2B are flowcharts illustrating a method of controlling the operation of the portable terminal according to an exemplary embodiment of the present invention.

FIG. 2A illustrates an exemplary method of controlling the operation of a portable terminal in which the controller 130 is in the sleep mode, while the multimedia processor 170 performs the multimedia function in the active mode.

Referring to FIGS. 1 and 2A, the controller 130 is in a sleep mode in step S110. With the controller 130 in sleep mode, the portable terminal 100 can still perform a multimedia function by using the multimedia processor 170, regardless of the control of the controller 130.

The controller 130 determines whether a specified key signal is input in step S120. The specified key input can be an input from one of the keys included in the key input unit 140. In another example, in a portable terminal with which a PMP is combined and which has the key input 140 and the display unit 150 arranged on both surfaces of the main body, the specified key input may be an input from an external key arranged on the external surface of the portable terminal.

As illustrated in step S130, the controller 130 is converted from the sleep mode to the active mode if the specified key input is received.

If the controller 130 is converted to the active mode, a signal is output to cause the multimedia processor 170 to become inactive in step S140. In an exemplary embodiment, the controller 130 outputs the inactive signal to the multimedia processor 170. The inactive signal refers to a signal which inactivates the multimedia processor 170.

Therefore, if a specified key input is received while the multimedia function is performed, the portable terminal 100 finishes performing the multimedia function and is converted to a mode in which the portable terminal 100 can perform the mobile communication function. In an exemplary embodiment, the portable terminal 100 can independently perform the mobile communication function and the multimedia function according to the specified key input.

In an exemplary embodiment, the specified key input is received from a slideable key arranged on a side of the main body of the portable terminal 100. The slideable key may also function so as to prevent key inputs which are not intended by a user. That is, the slideable key can operate as a hold key at a first position and as a toggle key at a second position.

In an exemplary embodiment, the mobile communication function and the multimedia function are independently performed depending on the input of the toggle key when the slideable key is in the second position. Furthermore, if the slideable key is placed in the first position to operate as a hold key, no key input signals are transmitted into the controller 130 despite the user's key input. Accordingly, it is possible to prevent errors caused by non-intended key inputs in the operation of the portable terminal 100.

FIG. 2B is an exemplary embodiment illustrating the steps of controlling the operation of the portable terminal 100 in which the controller 130 is in the active mode. In this example, the multimedia processor 170 is in the inactive mode and the controller 130 is performing a mobile communication function.

Referring to FIGS. 1 and 2B, the controller 130 is in the active mode in step S210. As an example, the active mode of the controller 130 refers to a state in which the controller 130 is controlling the overall operation of the portable terminal 100.

The controller 130 determines whether a specified key input is received in step S220. The specified key input may be generated by one of the keys included in the key input unit 140. As an example, in a portable terminal with which a PMP is combined and which has a key input unit 140 and a display unit 150 arranged on both sides of the main body of the portable terminal 100, the specified key input may be received from a key that is arranged on an external surface of the portable terminal.

If the specified key input is received, the controller 130 determines that the user wants to use the multimedia function. Accordingly, an active signal is generated to activate the multimedia processor 170 in step S230. In an exemplary embodiment, the active signal is generated and output by the controller 130.

The controller 130 is converted to the sleep mode in step S240 if the multimedia processor 170, into which the active signal has been input, is converted to the active mode. Therefore, it is possible to reduce unnecessary consumption of electric current because the multimedia processor 170 can independently perform the multimedia function.

As mentioned above, according to exemplary embodiments of the present invention, the portable terminal having the controller controlling the mobile communication function and the multimedia processor controlling the multimedia function can independently perform the mobile communication function and the multimedia function according to a specified key input.

Furthermore, according to exemplary embodiments of the present invention, the controller which controls the mobile communication function need not control the multimedia processor which controls the multimedia function. Hence, it is possible to reduce power consumption and software errors occurring when the controller controls the multimedia processor.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for controlling an operation of a portable terminal comprising a mobile communication function and a multimedia function, the apparatus comprising:

a multimedia processor comprising an active mode and an inactive mode, for controlling a multimedia function only when the multimedia processor is in the active mode; and a controller for controlling a mobile communication function, the controller having at least a sleep mode and an active mode, wherein when the multimedia processor controls the multimedia function the controller is in the sleep mode, wherein when the controller is in the sleep mode, the controller can only receive a specified key signal to convert from the sleep mode to the active mode, and wherein the controller is converted to an active mode outputs an inactive signal when a specified key signal is input when the controller is in the sleep mode, and the multimedia processor is converted to the inactive mode from the active mode when an inactive signal is received by the multimedia processor.

2. The apparatus as claimed in claim 1, wherein the controller outputs an active signal to activate the multimedia processor when the specified key signal is input into the controller in a state when the multimedia processor is in an inactive mode, and the controller is converted to the sleep mode from the active mode.

3. The apparatus as claimed in claim 1, wherein the specified key is arranged on an external surface of the portable terminal. pg,11

4. The apparatus as claims in claim 1, wherein the specified key is slidable.

5. The apparatus as claimed in claim 1, wherein the controller outputs the inactive signal and then allows the portable terminal to perform the mobile communication function.

6. A method for controlling the operation of a portable terminal having a mobile communication function and the multimedia function, the method comprising:

performing the multimedia function by a multimedia processor in an active mode only if the controller is in the sleep mode, wherein when the controller is in the sleep mode, the controller can only receive a specified key signal to convert from the sleep mode to the active mode;

converting the controller from the sleep mode to an active mode if a specified key signal is input into the controller when the controller is in a state of being in the sleep mode, and outputting an inactive signal to the multimedia processor;

inactivating the multimedia processor based on the received inactive signal; and performing the mobile communication function by the controller which is converted to the active mode.

7. The method as claimed in claim 6, further comprising a step of outputting the active signal to activate the multimedia processor if the specified key signal is input into the controller when the controller is in a state of being in the active mode, and then converting the controller from the active mode to the sleep mode.

8. The method as claimed in claim 6, wherein the specified key is arranged on an external surface of the portable terminal.

* * * * *